United States Patent [19]
Kölling

[11] Patent Number: 6,142,901
[45] Date of Patent: Nov. 7, 2000

[54] BELT DRIVE

[75] Inventor: Rudi Kölling, Vlotho, Germany

[73] Assignee: BRECO Antriebstechnik Breher GmbH & Co., Westfalica, Germany

[21] Appl. No.: 09/145,109

[22] Filed: Sep. 2, 1998

[30] Foreign Application Priority Data

Sep. 8, 1997 [DE] Germany ........................ 279 23 242 U
Mar. 11, 1998 [DE] Germany ............................ 198 10 596

[51] Int. Cl.$^7$ .............................. F16H 55/30; F16G 5/20
[52] U.S. Cl. ............................ 474/153; 474/205; 474/152
[58] Field of Search .................................... 474/152, 153, 474/205, 250, 237, 204, 163, 167, 162

[56] References Cited

U.S. PATENT DOCUMENTS

| | | | |
|---|---|---|---|
| 3,216,273 | 11/1965 | Colmer, Jr. ......................... | 474/153 X |
| 4,647,278 | 3/1987 | Hull ........................................ | 474/205 |
| 5,704,861 | 1/1998 | Feuerborn ............................... | 474/205 |

FOREIGN PATENT DOCUMENTS

| | | | |
|---|---|---|---|
| 524845 | 1/1993 | European Pat. Off. ............... | 474/205 |
| 2910871 | 9/1980 | Germany ................................ | 474/153 |
| 248852 | 8/1987 | Germany ................................ | 474/205 |
| 1762052 | 9/1992 | U.S.S.R. .................................. | 474/153 |

*Primary Examiner*—David A. Bucci
*Assistant Examiner*—Marcus Charles
*Attorney, Agent, or Firm*—Fay, Sharpe, Fagan, Minnich & McKee, LLP

[57] ABSTRACT

A belt drive includes a toothed belt and a toothed wheel which have engaging tooth ribs and tooth grooves. The tooth ribs and the tooth grooves extend in an arcuate shape over the breadth of the toothed belt. The toothed wheel is of complementary construction. This results in automatic self guiding of the toothed belt with a high load bearing ability. The belt drive runs extremely quietly and with low vibration. This applies also to the case in which the belt runs tangentially over a support roller or runs round a support roller.

16 Claims, 9 Drawing Sheets

BELT DRIVE

FIELD OF THE INVENTION

The invention relates to a belt drive including a toothed belt and toothed wheel which have a tooth system constituted by engaging tooth ribs and tooth grooves.

The operating characteristics of such belt drives are determined, amongst other things, by two important parameters, namely on the one hand by the side guide on the toothed belt and on the other hand by the development of operating noise.

DESCRIPTION OF THE PRIOR ART

In order to prevent the toothed belt running laterally off the toothed wheel, the toothed wheel has been provided with lateral webs. This makes the manufacture of the toothed wheel more expensive. An additional factor is that the lateral contact surfaces increase the wear and the operating noise. The toothing has also been divided into a number of rows which are offset from one another in such a manner that the lateral surfaces of the tooth ribs of one row were situated in front of the tooth grooves of the laterally adjacent row and thus constituted lateral contact surfaces. The problem of wear and of operating noise, however, remained. The manufacture of the toothed wheel was also as expensive as before since a number of component wheels had to be manufactured and joined together offset from one another.

In order to reduce the operating noise, noise-damping material has been arranged between the engaging tooth ribs and tooth grooves, whereby the wear resistance of the belt drive decreased and the manufacturing costs increased.

It is the object of the invention to improve the operating characteristics of the belt drive in a manner which is simple from the manufacturing point of view.

SUMMARY OF THE INVENTION

In order to solve this object the belt drive of the type referred to above is characterised in accordance with the invention in that the toothing on at least one section of the length of the tooth ribs and the tooth grooves extends in an arcuate shape over the toothed belt and the toothed wheel.

The arcuate shape of the tooth ribs and the tooth grooves produces an automatic self-centering of the toothed belt on the toothed wheel without the requirement for lateral contact surfaces. The consequence is a corresponding simplification in manufacture. There is also no risk that the toothed belt moves up the tooth ribs on the toothed wheel when even small lateral deflections occur.

Above all, the operating noises of the belt drive are enormously reduced. The tooth ribs and tooth grooves no longer mesh together simultaneously over their entire breadth (linearly) but mesh progressively point by point. The polygon effect, which could not be avoided with conventional belt drives, is practically completely eliminated. The polygon effect results from the fact that the point of engagement of the toothed belt with the toothed wheel periodically alters in the radial direction as a result of the conventional toothing, which is directed linearly perpendicular to the direction of movement. This results in the toothed belt impinging against the toothed wheel with a certain radial velocity component. Tests have shown that this impingement caused by the polygon effect represents the main cause for the production of operational noise. Since the arcuate toothing in accordance with the invention eliminates this effect there is a substantial lack of noise.

The toothed belt thus runs with extremely low vibration so that toothed tension rollers, as were otherwise necessary for the purpose of vibration damping, can be omitted.

A further advantage of the belt drive in accordance with the invention is produced if the toothed belt runs in the form of a conveyor belt tangentially over horizontal, cylindrical support rollers. With conventional toothing, each tooth groove results in sinking and each tooth rib in rising of the toothed belt. The toothed belt thus "chatters" over the support rollers. The same effect is produced, if not quite so markedly, when a toothed belt with conventional is toothing is guided around a cylindrical deflection roller. With the arcuate toothing in accordance with the invention this "chattering" does not occur.

The belt drive in accordance with the invention makes a tooth loading possible which is at least 5% higher compared to conventional toothing under conditions which are otherwise the same by reason of the fact that the length of the tooth ribs is larger than the breadth of the toothed belt. The length over which engagement occurs is thus increased so that the increased tooth loading does not exceed the permissible flank pressure.

The invention basically permits any desired arcuate shape. It is, however, advantageous for manufacturing reasons to make the arcuate sections of the tooth ribs and the tooth grooves of circular arcuate shape.

The invention also imposes no limit as regards the tooth pitch. It is, however, particularly advantageous in this connection that the shape of the toothing is such that a forwardly situated tooth rib in the direction of movement only terminates its engagement movement when the subsequent tooth rib has already started its engagement movement. This promotes operational silence of the belt drive.

It can be advantageous under certain circumstances for producing a substantial overlap to construct the arcuate toothing of elliptical shape, the major axis of the ellipse being directed in the direction of movement of the toothed belt and the toothed disc, respectively.

A further preferred feature is that a respective linear section is connected on both sides to the arcuate sections of the tooth ribs and the tooth grooves. Toothing is thus produced whose linear limbs are connected together by an arc. Gaps can readily be provided between the individual sections of the tooth ribs.

It is proposed in an important embodiment of the invention that the toothing be divided into at least two rows extending in the direction of movement. Each row is occupied by tooth ribs and tooth grooves, widely varying shapes being possible. Thus the tooth ribs and tooth grooves of adjacent rows can merge directly into one another. Gaps can also be provided between the tooth ribs of adjacent rows which facilitate the escape of air during the engagement process. It is particularly advantageous to offset the tooth ribs and the tooth grooves in one of the rows of the toothing in the direction of movement with respect to that in the adjacent row. This also facilitates the escape of air and further contributes to increasing the operational silence of the belt drive.

The tooth ribs and the tooth grooves in adjacent rows of the toothing preferably constitute mutually offset semi-arcs. A particularly simple pattern is thereby produced. A particular advantage is also achieved if the crests of the arcs of the toothing are directed in the direction of movement of the toothed belt and the toothed wheel, respectively. A self-centering action is in fact produced which automatically guides the toothed belt back into the correct meshed position if an external intervention should have temporarily disturbed the centering.

In this connection, it is proposed in an embodiment of the invention that the tooth ribs and the tooth grooves in adjacent rows of the toothing constitute arcs directed in opposite senses to one another. The self-centering effect is thus produced also with reversing direction of movement of the belt drive.

It is proposed in an important embodiment of the invention that the tooth ribs of the toothed belt and the tooth grooves of the toothed wheel each have a constant breadth whilst the tooth grooves of the toothed belt and the tooth ribs of the toothed wheel taper towards their ends. The advantage achieved thereby relates to manufacture. When manufacturing the toothed wheel a profiled milling machine is used which is guided on an arcuate path and thus mills a tooth groove. For the next tooth groove the system is advanced by one tooth pitch. The tooth grooves are thus milled on their convex surface by the inner side of the milling machine in its first position whilst the concave flanks are subjected to the action of the outer side of the milling machine in its second position. The important simplification resides in the fact that the pivotal path of the milling machine remains constant—with a circular arcuate shaped toothing of the pivotal radius of the milling machine. The same conditions, but mirror reversed, are present when manufacturing the toothed wheel shape for the toothed belt.

It is further advantageous that a channel of constant breadth extends in the base of each tooth groove in the toothed belt. Its depth is limited by the longitudinally extending wire strands which are embedded in the material of the toothed belt. The advantage in this case again relates to the manufacturing process.

The mould for producing the toothed belt, is as mentioned, constructed in the form of a toothed wheel. The wire strands are tightened by means of this toothed wheel. In order to prevent the wire strands from constituting the bases of the tooth grooves in the finished toothed belt, each tooth rib in the mould carries a so-called winding protrusion of very small breadth. If the winding protrusions were to be formed together with the tooth grooves of the mould, the winding protrusions, and also the tooth ribs of the mould, would have a breadth which decreases towards the edges. This is unacceptable by reason of the breadth of the winding protrusions which is in any event extremely small. Accordingly, when machining the front flanks and the rear flanks of the winding protrusion, the pivotal path, optionally the pivotal radius, of the milling machine (a separate machine is used) is altered such that the breadth of the winding protrusions remains constant. This then produces the constant breadth of the channels in the tooth grooves of the toothed belt. The geometrical relationships, namely the tooth pitch, the arcuate shape of the toothing and its breadth, are so selected that not only is, as mentioned, a winding protrusion of constant breadth produced but also that the breadth of the tooth ribs of the mould (that is to say the tooth grooves of the toothed belt) does not fall below a minimum breadth at their ends. This is determined by the breadth of the base of the winding protrusion.

It is further proposed in an important embodiment of the invention that the arcs of the toothed belt are of different curvature to the arcs of the toothed wheel. This offers an optimum possibility of controlling the meshing process of the toothing. Thus the beginning of the meshing can occur with a small clearance so that practically no friction occurs. The clearance can then be progressively reduced until clearance-free meshing is produced.

The invention will be described below in more detail with reference to preferred exemplary embodiments in conjunction with the accompanying drawings.

DESCRIPTION OF THE PREFERRED EMBODIMENTS

Figure 1:
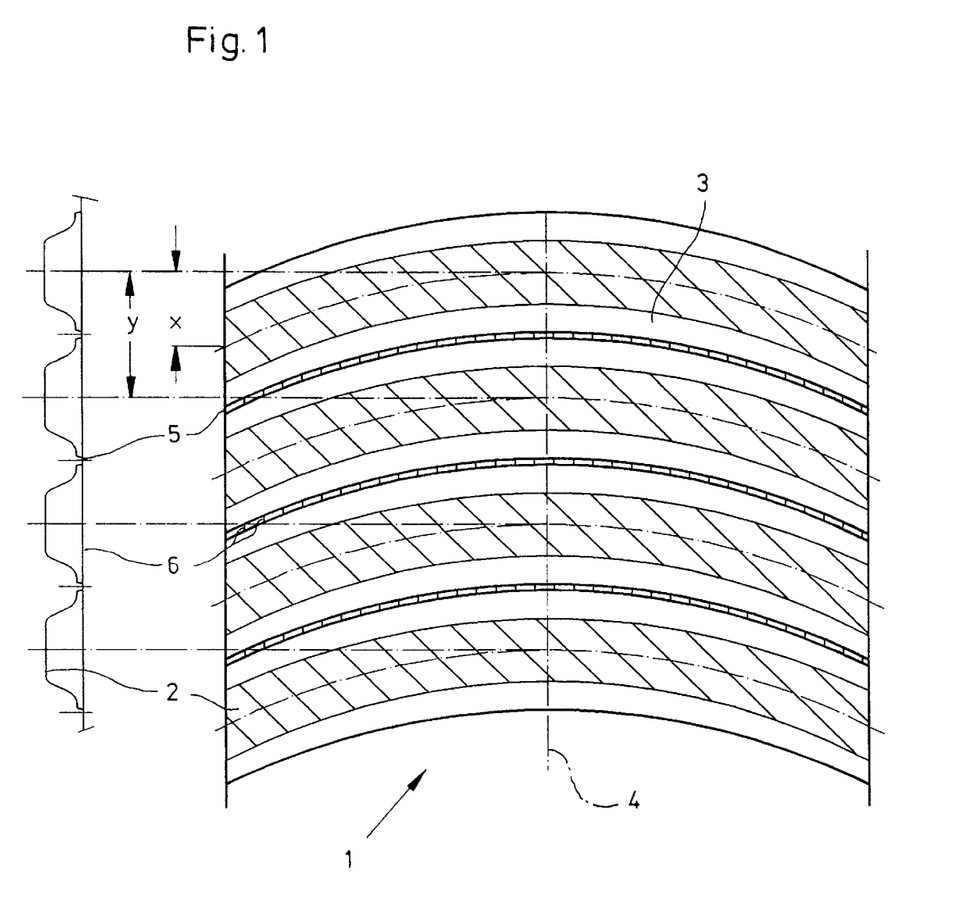
FIGS. 1 to 8 of the drawings are plan views of the profiled side of different toothed belts, the contour of the toothed belt being indicated on the left-hand side in each case. A few tooth ribs of the toothed wheel are indicated between the tooth ribs of the toothed belt in the embodiment shown in FIG. 9.

The toothed belt 1 shown in FIG. 1 is provided with tooth ribs 2 and tooth grooves 3. The tooth ribs 2 are hatched in this case—as also in all the other Figures—for reasons of clarity.

The tooth ribs 2 and the tooth grooves 3 extend in an arcuate shape over the breadth of the toothed belt 1 symmetrically with respect to its longitudinal central line 4. The gear tooth system is of circular arcuate shape in the present case.

The dimension x, measured in the longitudinal direction of the toothed belt 1, of each arc from the longitudinal center line 4 to the edges of the toothed belt, plus the thickness of the tooth ribs is larger than a tooth pitch y. It is thus ensured that a forwardly situated tooth rib in the direction of movement only terminates its meshing movement when the subsequent tooth rib has already started its meshing movement.

The toothed belt 1 is provided in the present case for non-reversible operation, namely for upward movement in FIG. 1. The crowns of the arcs thus point in the direction of movement.

The toothed belt 1 together with an associated toothed wheel constitutes a belt drive in accordance with the invention. The toothed wheel is of complementary construction as regards its tooth ribs and tooth grooves. A separate illustration of it is thus omitted.

The belt drive ensures self guiding of the toothed belt on the toothed wheel, whereby there is no danger of the toothed belt running up the tooth ribs of the toothed wheel immediately a lateral deflection occurs. Instead, the gear tooth system, which is arcuate in the direction of movement, produces an automatic recentering of a laterally deflected toothed belt. The toothed belt operates with an extremely high degree of operational silence and minimal noise development since no polygon effect occurs. Toothed tension rollers for oscillation damping are not necessary. The belt can also run over cylindrical support rollers tangentially without "chattering". The same applies also to passing around cylindrical deflection rollers.

It will be apparent from the drawing that the tooth ribs 2 are of constant breadth whilst the tooth grooves 3 taper from the center towards the edges. This is the result of a particularly simple manner of manufacture. The tool, which is in the nature of a toothed wheel, for forming the toothed belt is produced by milling its tooth grooves, which later form the tooth ribs of the toothed belt, by a milling machine whose pivot point is advanced in each case by one tooth pitch. The tooth ribs of the tool, which later form the tooth grooves in the toothed belt, are thus milled on the convex flank from the internal surface of the milling machine in its first position whilst the concave flanks are subject to the action of the outer surface of the milling machine in its second position. The crucial simplification resides in the fact that the pivotal radius of the milling machine need not be altered. This advantage is particularly effective also in the manufacture of the actual toothed wheel.

The drawing shows further that the base of each tooth groove 3 has a channel 5 of constant breadth which extends to wire strands 6 which are embedded in the material of the toothed belt 1. The channel 5 is produced by the so-called winding protrusion on the tooth ribs of the tool by means of which the wire strands 6 are tightened. When machining the flanks of the winding noses, the associated milling machine is also advanced by one tooth pitch, whereby its pivotal radius also alters so that the winding noses are produced with a constant breadth. Since they are extremely narrow, tapering towards the edges could not be tolerated.

Figure 2:
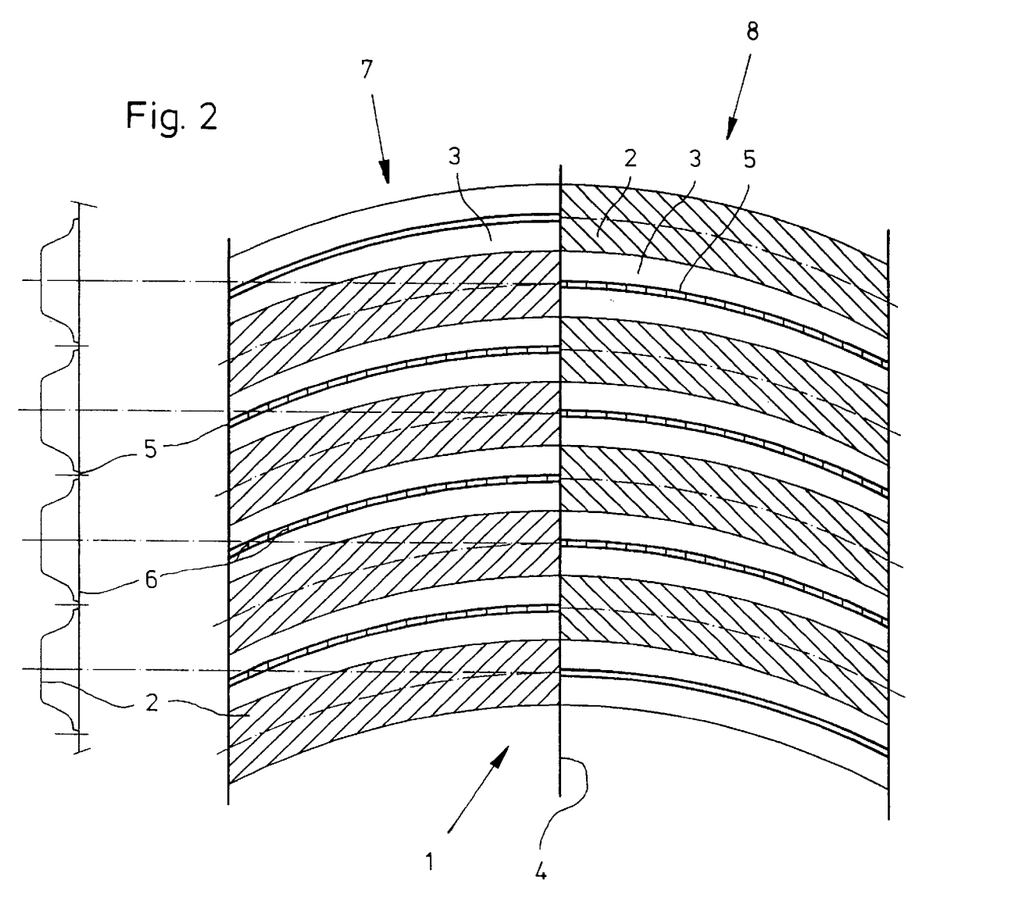

The embodiment of FIG. 2 differs from that of FIG. 1 in that the tooth system is divided into two rows 7 and 8 extending in the direction of movement and that the tooth ribs and tooth grooves of one row are offset with respect to those of the other row. This produces a further increase in the operational silence of the belt drive. The tooth ribs and tooth grooves of the rows are constituted by mutually offset semi-arcs.

Figure 3:
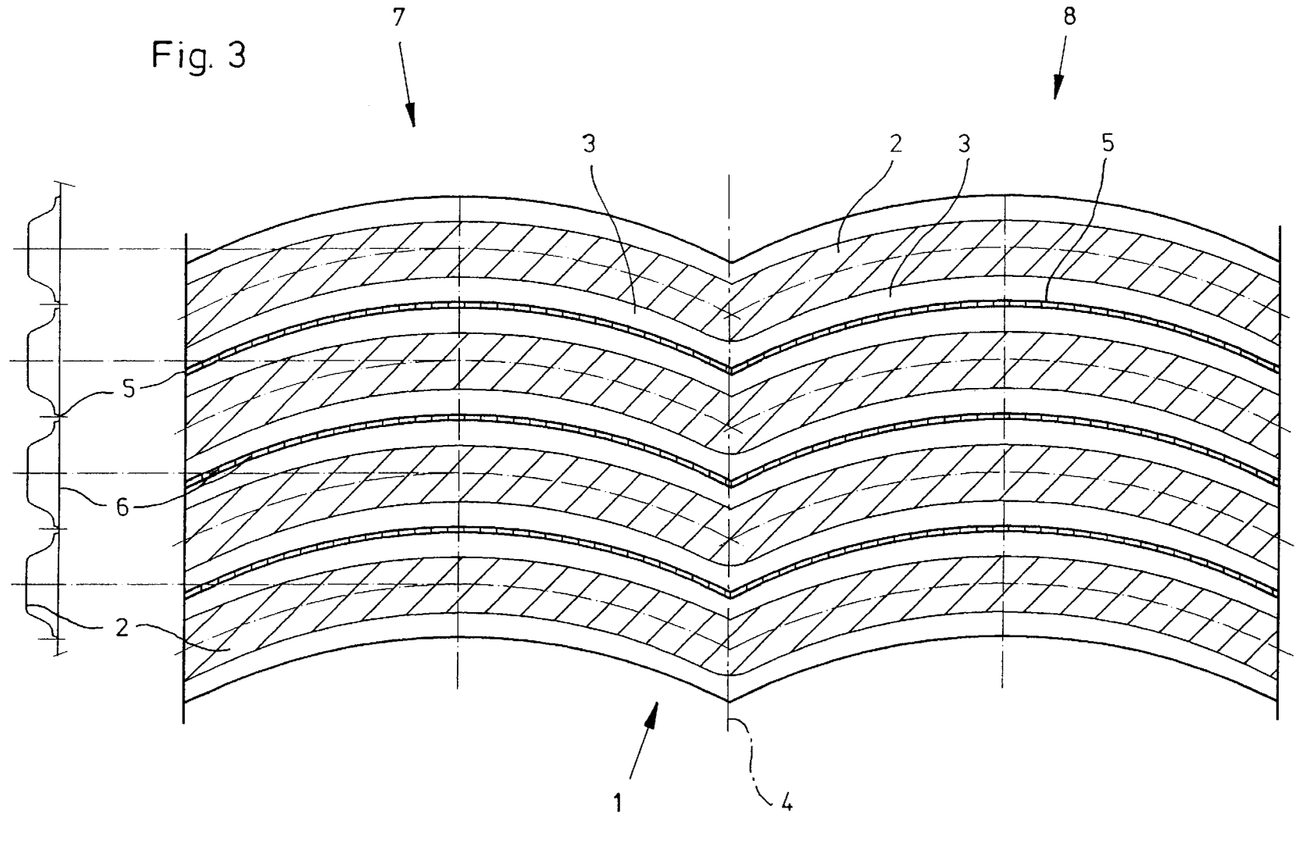

The tooth system is also divided into the two rows 7 and 8 in FIG. 3. However, the tooth ribs and the tooth grooves of the two rows directly adjoin one another. However, the toothed wheel in this embodiment can be manufactured in a single piece. When milling the tooth grooves of the toothed wheel, the milling machine passes through a reversal point on their peripheral centre line. This may be seen in FIG. 3 at the lower arcuate transitions of the tooth ribs 2 on the longitudinal central line 4 of the toothed belt. Peaks are produced here if the toothed wheel is manufactured from two separate, connected wheels.

Figure 4:
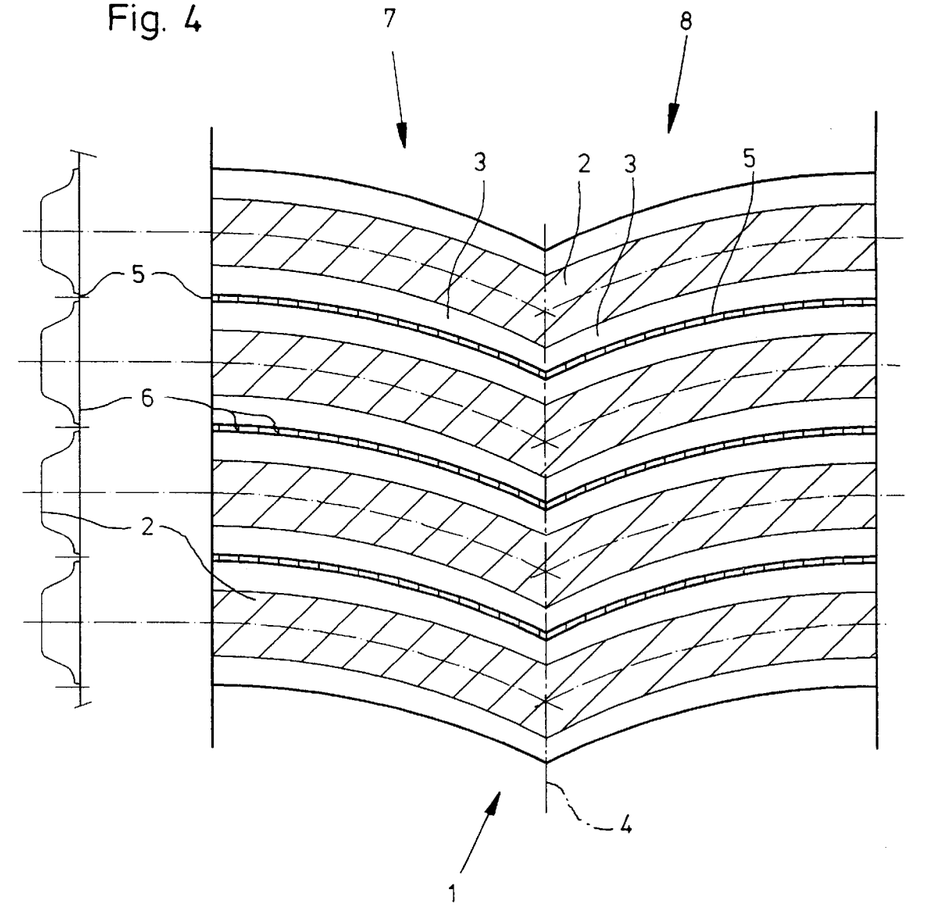

A corresponding embodiment is illustrated in FIG. 4. This embodiment otherwise differs from that of FIG. 3 in that the tooth ribs 2 and the tooth grooves 3 in the two rows 7 and 8 each comprise semi-arcs.

Figure 5:
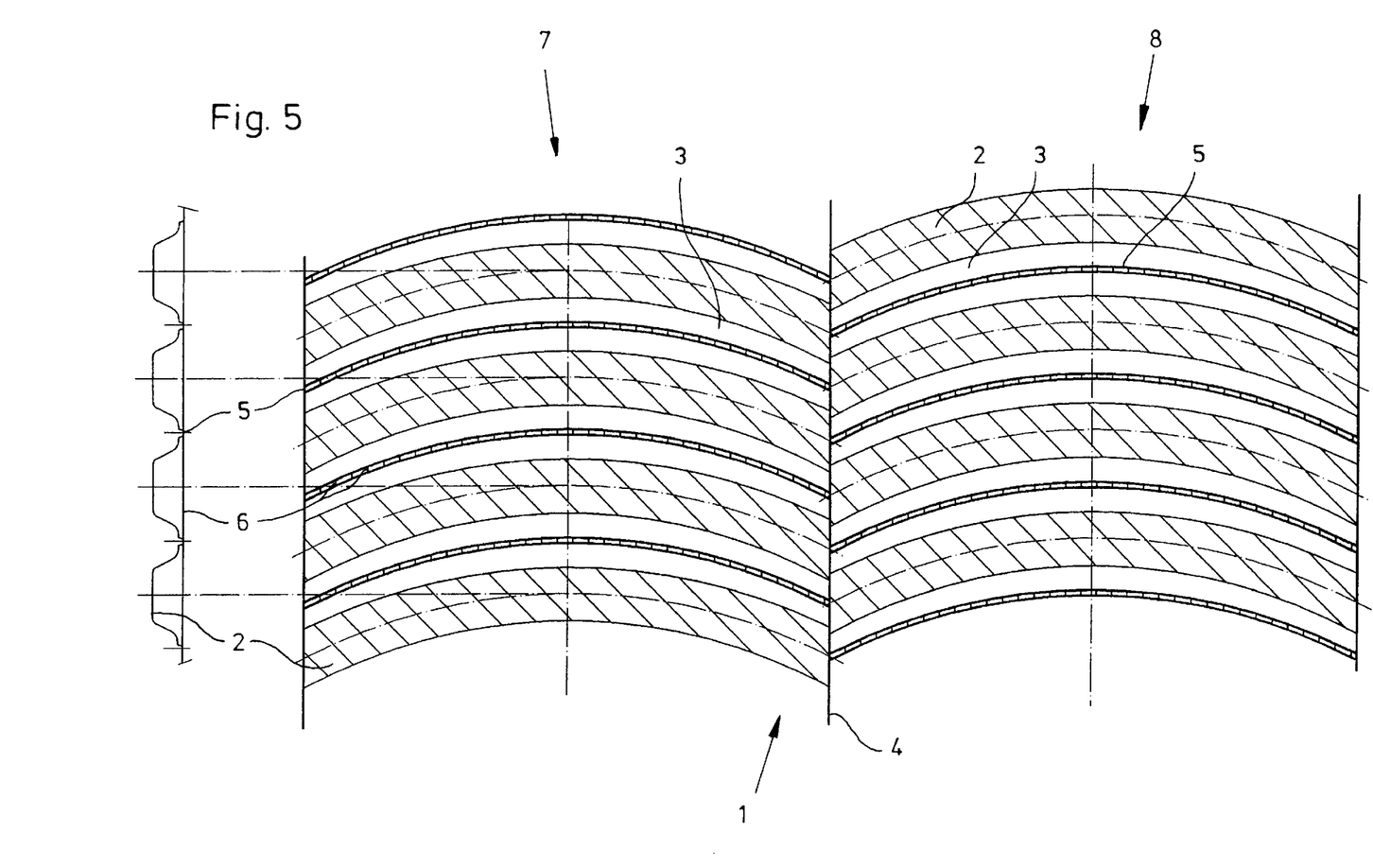

The embodiment of FIG. 5 also follows that of FIG. 3. It relates to a modification in which the tooth ribs 2 and the tooth grooves 3 of the two rows 7 and 8 are offset from one another.

Figure 6:
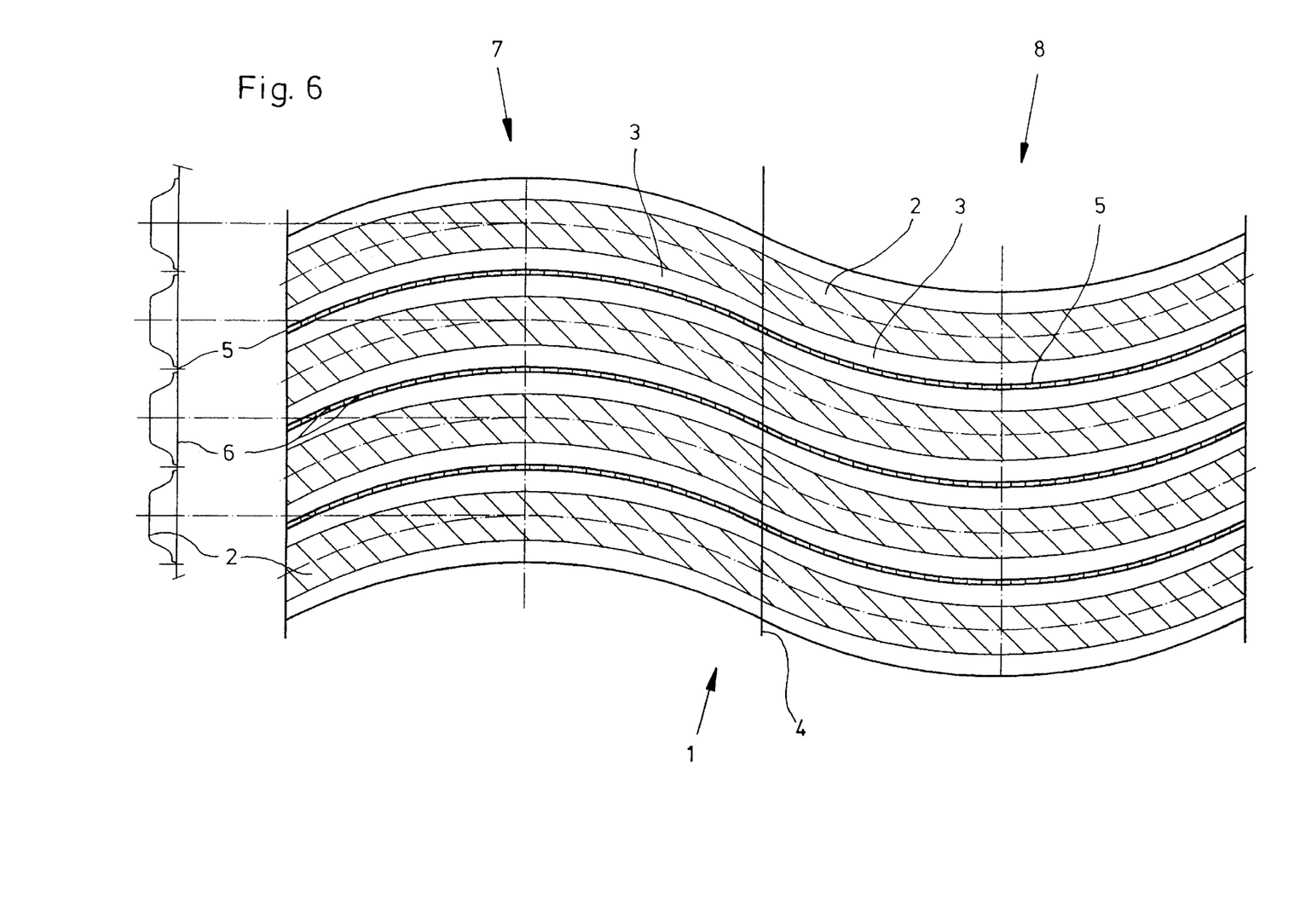
Figure 7:
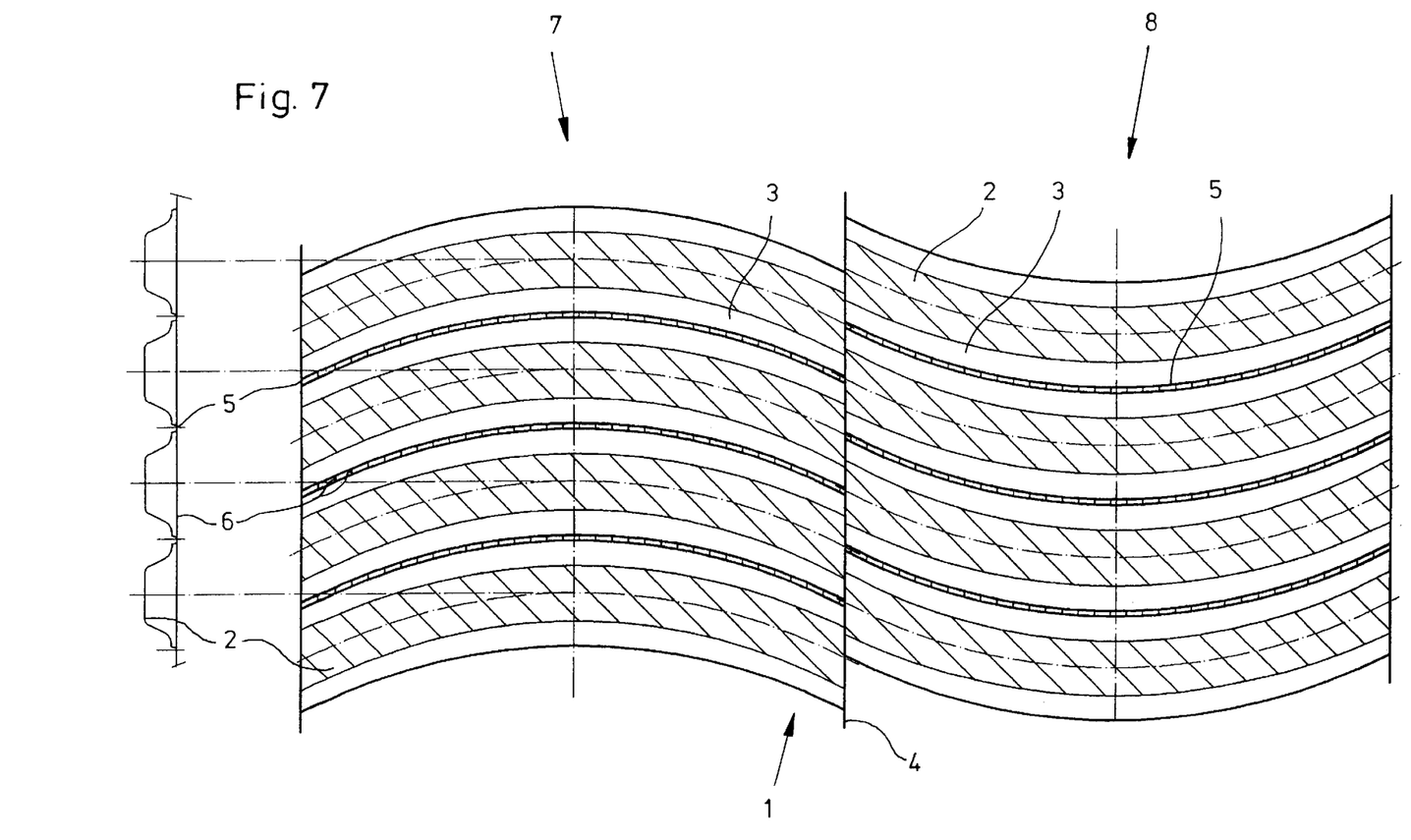

The belt drives described above are preferably provided for an irreversible direction of movement, the crests of the arcs of the toothing pointing in the direction of movement. The embodiment of FIG. 6, on the other hand, is so constructed that the belt drive develops the advantage of self-centering in both directions of movement. For this purpose, the tooth ribs 2 and the tooth grooves 3 of the two rows 7 and 8 constitute arcs which are directed in opposite senses to one another. The same applies also to the embodiment of FIG. 7, whereby in this case the tooth ribs 2 and the tooth grooves 3 of the two rows 7 and 8 are offset from one another in the direction of movement.

Figure 8:
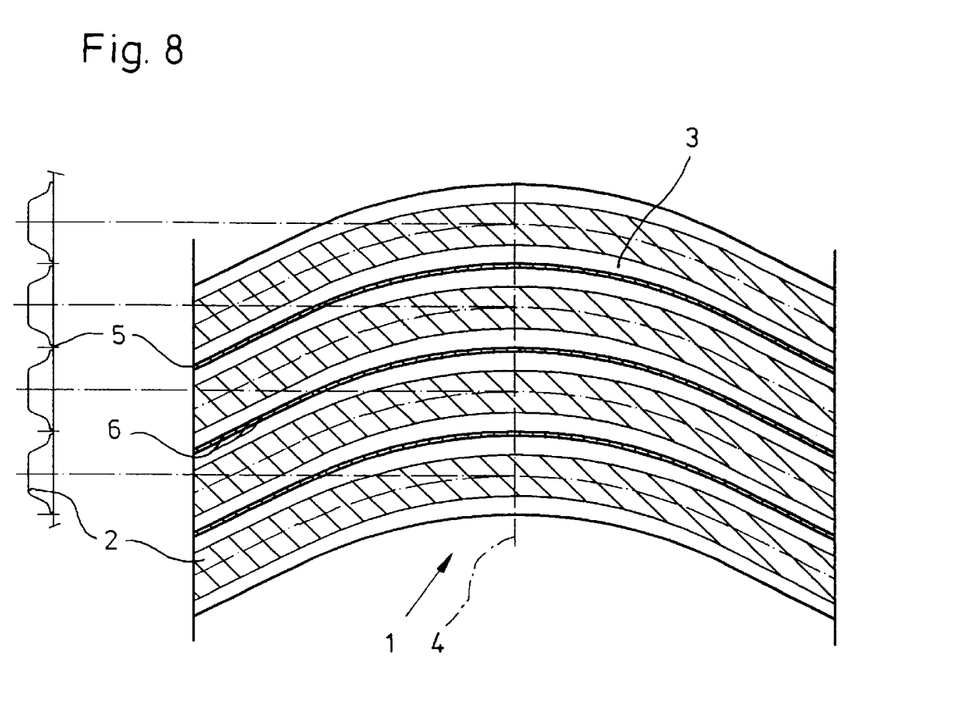

The embodiment of FIG. 8 substantially corresponds to that of FIG. 1, but with the proviso that only the central section of the toothing, namely the region on both sides of the longitudinal sectional line 4, is of arcuate construction. Linear sections are connected to the arcs at these sides.

Figure 9:
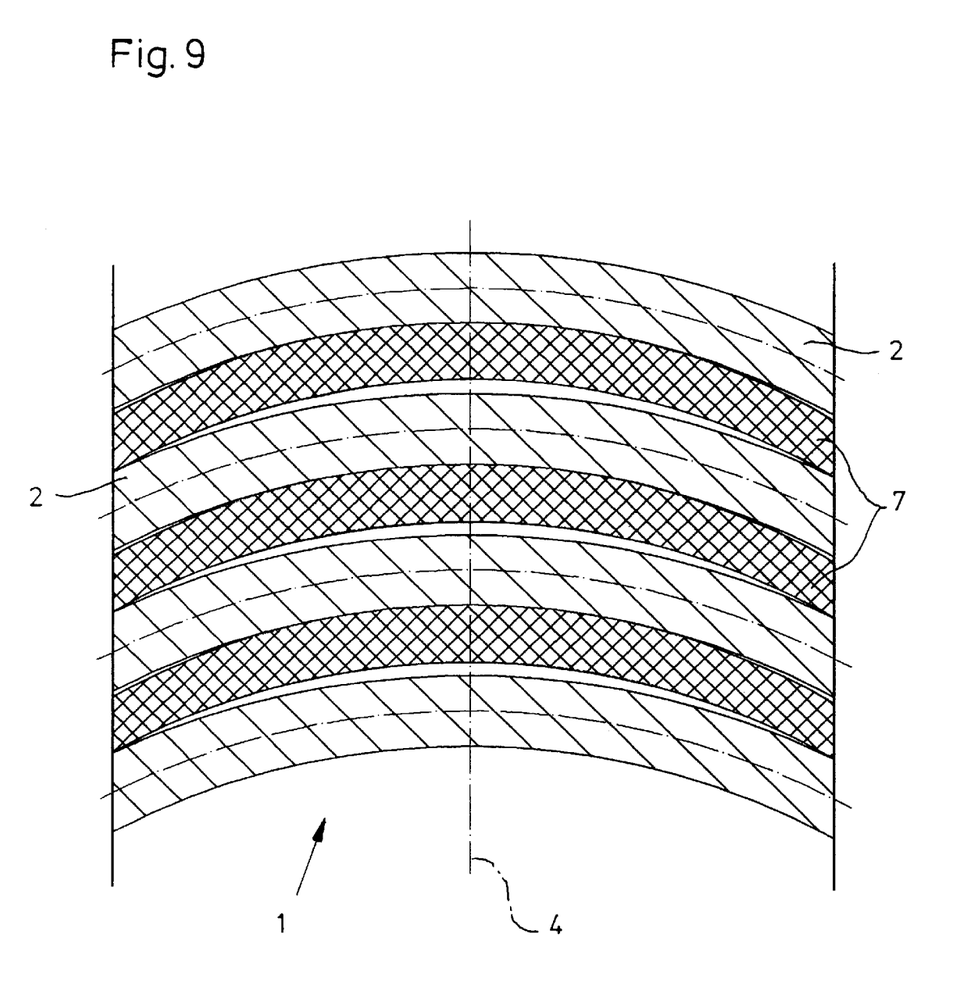

Finally, FIG. 9 shows, in addition to the tooth ribs 2 of the toothed belt, further tooth ribs 7 which belong to the toothed wheel which is otherwise not shown. As may be seen, the curvatures of the tooth ribs 7 do not coincide with those of the tooth ribs 2. The meshing characteristics of the belt drive may be influenced in this manner with very simple means. Meshing can begin with tooth clearance, this progressively decreasing and finally merging into a point engagement on both sides.

Furthermore, modifications are of course possible within the scope of the invention. Thus instead of circular arcuate toothing, elliptical toothing can be selected, the major axis of the ellipse coinciding with the longitudinal central line 4. This construction will be selected if the overlap is substantially to exceed one tooth pitch. Any desired tooth pitch can be selected differing from the illustrated tooth pitches. Finally, the invention may be used on belt drives of any desired type, whereby it is to be stressed that higher powers and higher speeds may be achieved in every case than is possible with conventional belt drives, the toothing of which extends in a straight line transverse to the direction of movement. The invention is suitable above all for belt drives with toothed belts of thermoplastic polymer materials.

What is claimed is:

1. A belt drive comprising:
    a toothed belt and a toothed wheel which have toothing constituted by engaging tooth ribs and tooth grooves, wherein the ribs and grooves of the belt and wheel extend at least partially across the breadth of the belt and the breadth of the wheel in an arcuate shape, whereby a corresponding development of the wheel in a development direction defines tooth ribs and grooves that are defined on respective arcs that extend transverse to the development direction and that are directed and crest in one of: (i) the development direction; and, (ii) an opposite direction.

2. The belt drive as claimed in claim 1, wherein the arcuate sections of the tooth ribs and the tooth grooves are of circular arcuate shape.

3. The belt drive as claimed in claim 1, wherein the shape of the toothing is such that a forwardly situated tooth rib in the direction of movement only terminates its meshing movement when a subsequent tooth rib has already started its meshing movement.

4. The belt drive as claimed in claim 1, wherein a respective linear tooth section is connected on both sides to the arcuate sections of the tooth ribs and the tooth grooves.

5. The belt drive as claimed in claim 1, wherein the toothing is divided into at least two rows extending in the direction of movement.

6. A belt drive including a toothed belt and toothed wheel which have toothing constituted by engaging tooth ribs and tooth grooves, characterised in that the toothing extends over the toothed belt and the toothed wheel in an arcuate shape, at least on one section of the length of the tooth ribs and the tooth grooves, and further characterised in that the tooth ribs and the tooth grooves in one of the rows of the toothing are offset in the direction of movement with respect to that in the adjacent row.

7. The belt drive as claimed in claim 6, wherein the tooth ribs and the tooth grooves in adjacent rows of the toothing constitute mutually offset semi-arcs.

8. The belt drive as claimed in claim 1, wherein the crests of the arcs of the toothing are directed in the direction of movement of the toothed belt and toothed wheel, respectively.

9. The belt drive as claimed in claim 5, wherein the crests of the arcs of the toothing are directed in the direction of movement of the toothed belt and the toothed wheel, respectively.

10. A belt drive including a toothed belt and toothed wheel which have toothing constituted by engaging tooth ribs and tooth grooves, characterised in that the toothing extends over the toothed belt and the toothed wheel in an arcuate shape, at least on one section of the length of the tooth ribs and the tooth grooves, and further characterised in that the tooth ribs and the tooth grooves in adjacent rows of the toothing constitute arcs which are directed in opposite senses to one another.

11. Belt drive including a toothed belt and a toothed wheel which have toothing constituted by engaging tooth ribs and tooth grooves, characterised in that the toothing extends over the toothed belt and the toothed wheel in an arcuate shape, at least on one section of the length of the tooth ribs and the tooth grooves, and further characterised in that the tooth ribs on the toothed belt and the tooth grooves on the toothed wheel each have a constant breadth whilst the tooth grooves on the toothed belt and the tooth ribs on the toothed wheel taper towards the ends.

12. Belt drive including a toothed belt and a toothed wheel which have toothing constituted by engaging tooth ribs and tooth grooves, characterised in that the toothing extends over the toothed belt and the toothed wheel in an arcuate shape, at least on one section of the length of the tooth ribs and the tooth grooves, wherein the toothing is divided into at least two rows extending in the direction of movement, and further characterised in that the tooth ribs on the toothed belt and the tooth grooves on the toothed wheel each have a constant breadth whilst the tooth grooves on the toothed belt and the tooth ribs on the toothed wheel taper toward the ends.

13. Belt drive as claimed in claim 11, characterised in that a channel of constant breadth extends in the base of each tooth groove in the toothed belt.

14. Belt drive as claimed in claim 12, characterised in that a channel of constant breadth extends in the base of each tooth groove in the toothed belt.

15. Belt drive as claimed in claim 11, characterised in that the arcs of the toothed belt have a different curvature to the arcs of the toothed wheel.

16. Belt drive as claimed in claim 12, characterised in that the arcs of the toothed belt have a different curvature to the arcs of the toothed wheel.

* * * * *